United States Patent Office 2,897,719
Patented Aug. 4, 1959

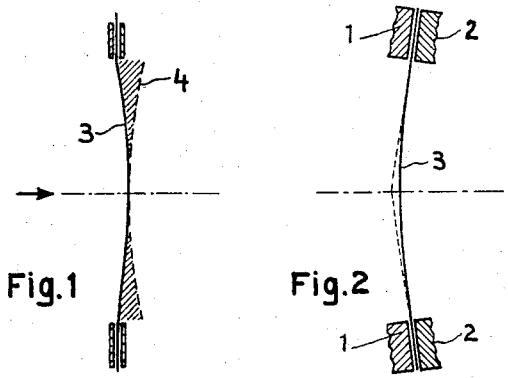
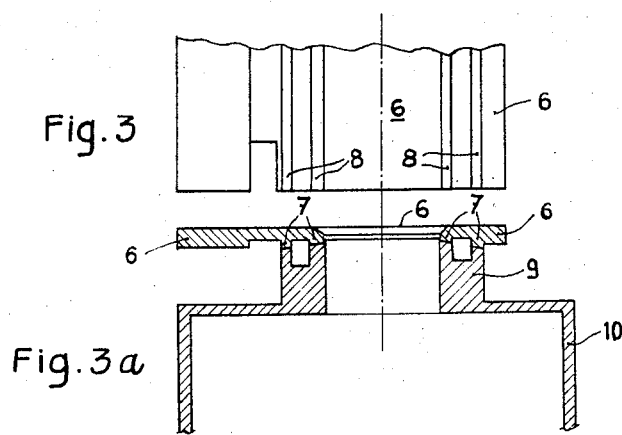
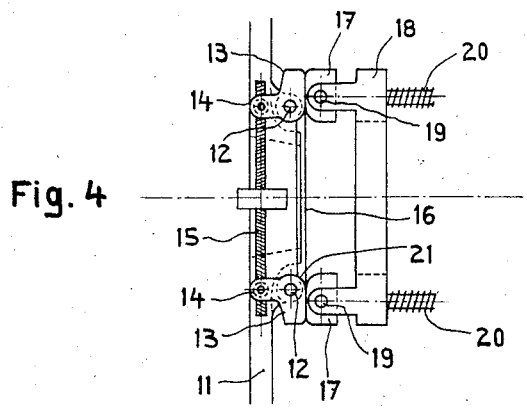

2,897,719

FILM GUIDES

Hans Tiller, Kilchberg, Zurich, Switzerland, assignor to Cycloptic Anstalt für Optik und Mechanik In Vaduz, Furstentum, Liechtenstein Application June 13, 1955, Serial No. 515,129

Claims priority, application Switzerland June 12, 1954

2 Claims. (Cl. 88—17)

The present invention relates to cameras or projectors for taking or projecting pictures, respectively. More particularly, the present invention relates to a film guiding apparatus for devices of this type.

It is known that in cinematographic cameras and projectors the film strip is bulged laterally about its longitudinal axis, and as a result the sharpness of the image decreases at the sides of the picture area. In general this bulging of the film is curved oppositely to the curvature of the image field of the objective so that the lack of sharpness is aggravated particularly at the corners of the picture. This lack of sharpness becomes more noticeable as the aperture for the light passing through the objective becomes larger and as the focal length becomes shorter in relation to the diagonal of the film gate, that is, as the picture angle becomes greater. As a result up to the present time objectives having a relative opening greater than 1:1.5 have not been used although an increase in the brightness of a projected image is very much desired, particularly for color film, stereo pictures, and for projection on very large areas.

Although this problem is known in the art and several attempts have been made to overcome it, all of the known solutions to this problem are accompanied by undesirable factors such as their complicated structure, scratching of the film, and rapid wearing away of the side edges of the film as well as of the guiding structure therefor.

One of the objects of the present invention is to overcome the above drawbacks by providing a film guiding apparatus which will bulge the film in correspondence to the curvature of the image field of the objective and which at the same time will maintain the picture frame portions of the film untouched both on its emulsion side and its emulsion-free side.

Furthermore, it is an object of the present invention to accomplish the above object with a structure which is extremely simple and rugged.

Also, it is an object of the present invention to provide a structure capable of accomplishing the above objects and at the same time being adjustable so that the curvature of the bulged film may be controlled.

With the above objects in view the present invention mainly consists of a film guiding apparatus to be used in a camera or a projector, this apparatus including a film guiding member formed with an aperture so that when film is located opposite this aperture light may pass through both the aperture and the film. A runner means is located on opposite sides of this aperture and is carried by the film guiding member for guiding film for movement by the aperture and for bulging the film in the space between the runner means to a curvature corresponding substantially to the curvature of the image field of the objective, this runner means having strip shaped film engaging surfaces respectively located at opposite sides of the aperture and spaced from each other by a distance sufficient to leave untouched the picture frame area of the film both on its emulsion side and its emulsion-free side. A pressure means is located opposite the film guiding member and includes a pair of film engaging portions located opposite the runner means for pressing side edge portions of a film strip respectively against the film engaging surfaces of the runner means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic illustration of the problem solved by the present invention;

Fig. 2 is a schematic illustration of the manner in which the problem is solved according to the present invention;

Fig. 3 is a fragmentary front view of one embodiment of a structure according to the present invention;

Fig. 3a is a transverse sectional view of the structure shown in Fig. 3; and

Fig. 4 is a fragmentary top plan view of a different embodiment of a device constructed in accordance with the present invention.

Referring to the drawings, Fig. 1 illustrates the conditions which will result when no correction of the film curvature transverse to its longitudinal axis is provided. The film 3, through which light passes from the left as indicated by the arrow in Fig. 1, bulges transversely to its length toward an unillustrated objective located to the right of film 3, as viewed in Fig. 1. The curvature of the image field of the objective is shown in Fig. 1 by the curve 4, and it is apparent that the curve 4 is curved oppositely to the bulge of the film 3, so that as a result a disturbing lack of sharpness is present in an image which is projected, for example.

The solution of the problem according to the present invention is illustrated schematically in Fig. 2. A pair of elongated runners 1 are parallel to each other, extend longitudinally along the film strip 3 at its side edge portions, and are respectively located on opposite sides of the film gate. A pair of pressure members 2 are respectively located opposite runners 1 to maintain the side edge portions of the film 3 against the film engaging surfaces of the runners 1. As is indicated in Fig. 2, the pressure members 2 may have film engaging surfaces which match those of the runners 1, and these film engaging surfaces of elements 1 and 2 are so arranged that they give the film strip 3 a transverse bulge which corresponds substantially to the curve 4 shown in Fig. 1. In the example illustrated in Fig. 2, the film engaging surfaces of elements 1 and 2 are respectively located in a pair of planes which are inclined to each other and which intersect at the optical axis, as indicated in Fig. 2. However, it is also possible to provide runners 1 and pressure members 2 with curved film engaging surfaces, these surfaces having a curvature corresponding to that which is given to the films, according to Fig. 2. The guide elements 1 and 2 are shown only schematically in Fig. 2. In practice elements 1 are in the form of a pair of runners having film engaging surfaces along which the side edge portions of the film strip slide, and the pressure elements 2 are also in the form of runners respectively having film engaging surfaces directed respectively toward those of the runners 1.

Fig. 3 illustrates one embodiment of the present invention according to which the camera or projector is provided with a film guide member 6 formed in a known way with the aperture through which passes light which also passes through the film located opposite the aperture. This guide member 6 is supported in a known way in the interior of the camera or projector. In the particular example shown in Fig. 3 two pairs of runners 7 which are integral with film guide member 6 are respectively arranged on opposite sides of the aperture thereof and extend longitudinally with respect to the film. The runners 7 are provided with film engaging surfaces 8. The film, which is not shown in Fig. 3, is maintained against the runner 7 by the pressure members 9 which are also in the form of runners and which have film engaging surfaces corresponding to and mating with those of the runners 7 as is shown most clearly in the sectional portion of Fig. 3. The pressure members 9 are fixed, in the example illustrated in Fig. 3, to the objective holder 10 as by being formed integrally therewith, and for the purpose of inserting the film between runners 7 and 9 the objective 10 together with runners 9 may be moved away from and toward the film guide member 6 through any suitable mechanism. For the sake of simplicity springs are not shown in Fig. 3 for resiliently urging the runners 9 respectively toward the runners 7, but it is to be understood that the structure of Fig. 3 may be provided with such springs without any difficulty.

With the embodiment shown in Fig. 3 the runners on each side of the aperture are each provided with a pair of film engaging surface portions, although only one film engaging surface for each runner may be provided if desired. The film engaging surfaces 8 on one side of the aperture are located in a given plane and those on the other side of the aperture are located in another plane, and the runners 9 have their film engaging surfaces correspondingly arranged. These planes are inclined with respect to each other, as is apparent from Fig. 3, and in the example of Fig. 3 each of these planes makes an angle of 6.5° with a plane normal to the optical axis. The film strip is engaged only by the film engaging surfaces of the runners, and these surfaces are spaced from each other sufficiently to prevent the picture frame area of the film from being contacted both on the emulsion side of the film and on its emulsion-free side.

Fig. 4 shows a different embodiment according to which inclination of the film engaging surfaces with respect to each other is adjustable. The film guide member 11 which is formed with an aperature carries pivot pins 12 on which a pair of elongated runners 13 are pivotally mounted for turning movement about parallel axes which respectively extend longitudinally with respect to the runners 13 and which extend longitudinally with respect to the film strip. Only the top ends of the runners 13 are visible in Fig. 4. The runners 13 are fixedly connected at their top ends to a pair of lever arms 14 which are located opposite each other and which extend in the same direction from the runners 13. The free end of each lever arm 14 is bifurcated to provide a space in which a nut is located, and these nuts are pivotally carried by the lever arms 14 for free turning movement about axes parallel to those of the pivot pins 12, respectively. A pair of oppositely threaded screws 15 are in threaded engagement with these nuts and extend toward each other, and a turnbuckle is in threaded engagement with the adjacent ends of screws 15 so that the turnbuckle may be turned to draw screws 15 toward each other or to move them away from each other with resulting simultaneous turning of runners 13 in opposite directions about pivot pins 12, the runners 13 always turning through equal angles. Thus, the film engaging surfaces of runners 13, shown in Fig. 4 in engagement with film 16, may be turned out of the common plane in which they are located in Fig. 4 respectively into a pair of oppositely inclined planes to give the film 16 the desired bulge.

The free side edge portions of the film strip 16 are pressed against the film engaging surfaces of runners 13 by a pair of elongated pressure members 17 in the form of runners which are substantially coextensive with runners 13, respectively. A frame 18 carries pivot pins 19 which pivotally engage the runners 17 to support the latter for respective turning movement about axes parallel to those about which the runners 13 turn. The frame 18 fixedly carries pins which extend freely into bores formed in any suitable part of a camera or projector, such as, for example, in the objective holder. Coil springs 20 are respectively coiled about these pins and engage the frame 18 as well as the objective holder or the like in order to urge the frame 18 together with pressure members 17 toward the runners 13. In this way the pressure members 17 maintain the film which slides along the film engaging surfaces of elements 13 and 17 against the film engaging surfaces of elements 13, and it will be noted that the members 17 are capable of automatically turning to whatever angle the runners 13 take when they are adjusted. With the embodiment of Fig. 4 elements 13 and 17 are spaced from each other by a distance sufficient to leave untouched the picture frame area of the film strip 16 on its emulsion side and its emulsion-free side.

The above described structure has the following advantages:

In the first place the film is provided with a bulge opposite the aperture which corresponds to the curvature of the image of the field of the objective.

In the second place it is possible with the structure of the invention to use a projector objective with an extremely intense light passing therethrough. Such objectives could not be used up to the present time because they have only a very small sharpness in depth, so that the inherent bulging of the film is noticeable by lack of sharpness in the projected image. Furthermore the movement of the film into and out of focus with such an objective was very noticeable. Also, projector objectives with a relatively large opening have in general a relatively large curvature of the image field which is curved oppositely to the bulge of the film, as pointed out above.

Thirdly, the picture frame area of the film cannot become scratched with the structure of the invention because this portion of the film is completely out of contact with any elements as the film moves by the aperture.

Fourthly, the free side edge portions of the film strip, which are located outside of the picture frame areas thereof, is not subject to any greater wear or stresses than with conventional film engaging surfaces which are in a common plane.

Also, with the structure of the invention movement of the film into and out of focus is avoided to a very large extent since the inclined film engaging surfaces of the invention stress the film in opposition to its own inherent stress, so that the position of the film during projection, for example, changes to an extremely small degree, with the result that the sharpness of the image remains constant.

As has been pointed out above the structure of the present invention may be used in cinematographic projectors as well as in cinematographic cameras.

It will be understood that each of the elements described above, or two or more together, may also find a useful application in other types of film guides differing from the types described above.

While the invention has been illustrated and described as embodied in guides which bulge a film strip, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in a camera or projector, a film guiding apparatus comprising, in combination, a film guiding member formed with an aperture so that when film is located opposite said aperture light may pass through both the aperture and the film; a pair of elongated substantially parallel and rigid runners extending in the direction of film movement past said aperture, respectively located at opposite sides of said aperture, and respectively carried by said film guiding member for respective turning movement about a pair of axes extending longitudinally along said runners, said runners having film engaging surfaces having more than a single line contact with the film and spaced from each other by a distance at least as great as the width of a film frame to leave untouched the picture frame area of the film both on its emulsion side and its emulsion-free side; pressure means located opposite said film guiding member and including a pair of pivotable film engaging portions spaced from each other by the same distance that said runner means are spaced from each other and respectively directed toward said film engaging surfaces of said runners for pressing side edge portions of a film strip respectively against said film engaging surfaces of said runners, said film engaging portions of said pressure means being located substantially nearer to said runner means than the remainder of said pressure means so that the latter contacts the film only with its film engaging portions; a pair of lever arms respectively fixed to and extending in the same direction from said runners and located opposite each other; a pair of nut members pivotally carried by said lever arms, respectively; a pair of oppositely threaded screws threadedly engaging said nut members and extending toward each other; and a turnbuckle threadedly engaging said screws for simultaneously drawing the same toward each other or moving the same away from each other to turn said runners simultaneously in opposite directions respectively about said axes.

2. For use in a camera or projector, a film guiding apparatus comprising, in combination, a film guiding member formed with an aperture so that when film is located opposite said aperture light may pass through both the aperture and the film; a pair of elongated substantially parallel runners extending in the direction of film movement past said aperture, respectively located at opposite sides of said aperture, and respectively carried by said film guiding member for respective turning movement about a pair of axes extending longitudinally along said runners, said runners having film engaging surfaces having more than a single line contact with the film and spaced from each other by a distance at least as great as the width of a film frame to leave untouched the picture frame area of the film both on its emulsion side and its emulsion-free side; turning means operatively connected to said runners for respectively turning the same in opposite directions about said axes; a pair of elongated pressure members respectively located opposite said runners and having film engaging surfaces spaced from each other by the same distance that said runner means are spaced from each other and directed toward those of said runners so that the latter together with said pressure members may cooperate to maintain side edge portions of a film strip against said film engaging surfaces of said runners and that said runners in cooperation with said pressure members may bulge the film to a curvature corresponding substantially to the curvature of the image field of the objective, said film engaging portions of said pressure means being located substantially nearer to said runner means than the remainder of said pressure means so that the latter contacts the film only with its film engaging portions; and means turnably supporting said pressure members for respective movement about axes parallel to those about which said runners turn, whereby said pressure members automatically turn with said runners.

References Cited in the file of this patent

UNITED STATES PATENTS

| | | |
|---|---|---|
| 1,256,613 | Terwilliger | Feb. 19, 1918 |
| 1,297,532 | Akeley | Mar. 18, 1919 |
| 1,911,320 | Le Barbier | May 30, 1933 |
| 1,980,600 | Spoor | Nov. 13, 1934 |
| 2,002,074 | Basson | May 21, 1935 |
| 2,036,428 | Mihalyi | Apr. 7, 1936 |
| 2,049,041 | Berggren | July 28, 1936 |
| 2,063,016 | Ames | Dec. 8, 1936 |
| 2,431,681 | Barstow | Dec. 2, 1947 |
| 2,598,364 | D'Avitaya | May 27, 1952 |

FOREIGN PATENTS

| | | |
|---|---|---|
| 235,992 | Great Britain | July 2, 1925 |
| 525,110 | Great Britain | Aug. 21, 1940 |